United States Patent [19]

Hanacek et al.

[11] Patent Number: 4,466,554
[45] Date of Patent: Aug. 21, 1984

[54] SINGULATING SEEDER FOR HIGH DENSITY PLUG TRAYS

[75] Inventors: William A. Hanacek; Paul Bickel, both of Salinas, Calif.

[73] Assignee: Bud Antle, Inc., Salinas, Calif.

[21] Appl. No.: 364,577

[22] Filed: Apr. 1, 1982

[51] Int. Cl.³ ............................................. B65H 3/00
[52] U.S. Cl. ..................................... 221/1; 221/264;
222/216; 222/361; 47/1 A; 111/1; 111/89
[58] Field of Search ................... 221/1, 68, 233–235,
221/263, 264; 222/216–218, 221–222, 275–276,
361, 322, 345; 111/34, 1, 89–91, 99; 47/1 A

[56] References Cited

U.S. PATENT DOCUMENTS

| | | | |
|---|---|---|---|
| 3,545,164 | 12/1970 | Middleton | 221/264 X |
| 3,951,306 | 4/1976 | Ernst | 221/263 |
| 3,982,661 | 9/1976 | Feltrop | 221/235 |
| 4,072,251 | 2/1978 | Huang | 222/361 X |

FOREIGN PATENT DOCUMENTS 315194 7/1903 France ................. 221/264

Primary Examiner—Joseph J. Rolla
Assistant Examiner—Kevin P. Shaver

[57] ABSTRACT

A seeder is disclosed which includes prior art elements of a bottom stationary drop plate, an intermediate and sliding reciprocating cell plate with individual singulating cells, and "wiper bars" overlying and in sliding engagement with the cell plate. The improvement herein has the overlying wiper bars apertured in registry to the underlying drop holes. The cell plate at each individual singulating cell reciprocates to and from a position of registry with and to the wiper bar apertures above and drop apertures below. Reciprocation to a position of registry typically accumulates a singulated seed in each cell of the cell plate, and thus places the seeder in position for seeding with singulation. A probe, registered to the wiper bar aperture is mounted for reciprocation relative to the wiper bar aperture. The probe is actuated in its reciprocation when registration of the singulating cell to the wiper bar aperture and drop hole is effected. Upon occurrance of this registration, the probe passes downwardly, penetrates through and clears both the singulating cell and drop hole. Probe penetration typically continues passing beyond the bottom of the drop hole to urge seed into the receiving aperture only of the underlying plug. Apparatus for accomplishing this function remotely is disclosed.

5 Claims, 9 Drawing Figures

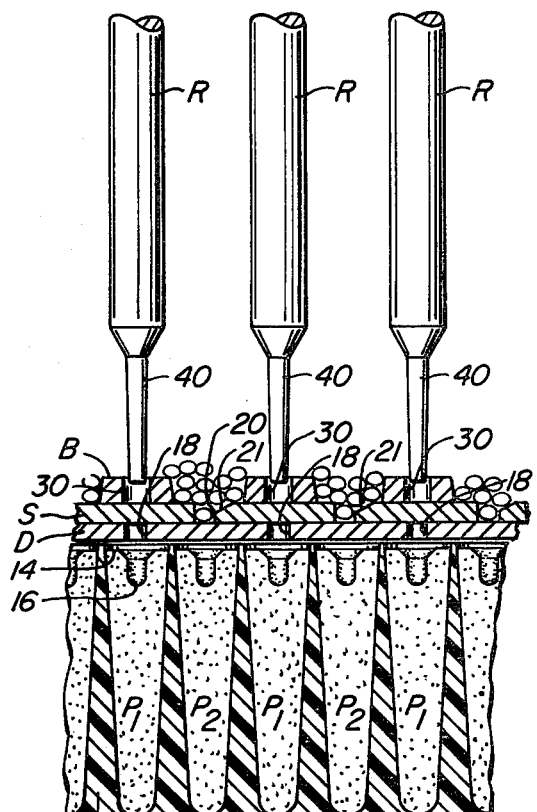
FIG._1A.
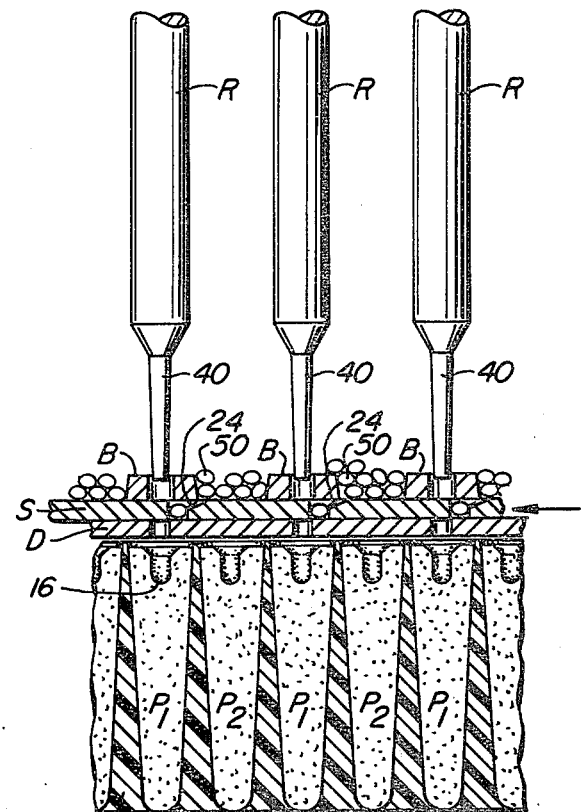
FIG._1B.
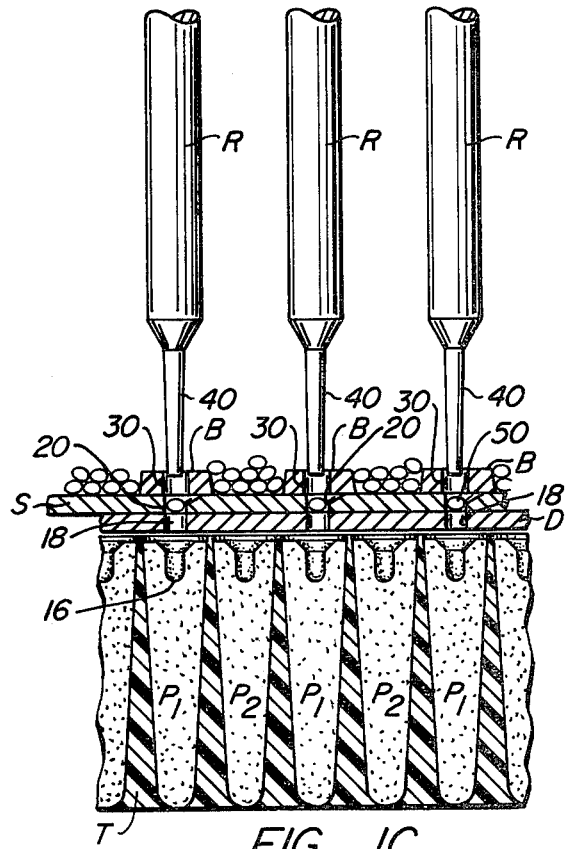
FIG._1C.
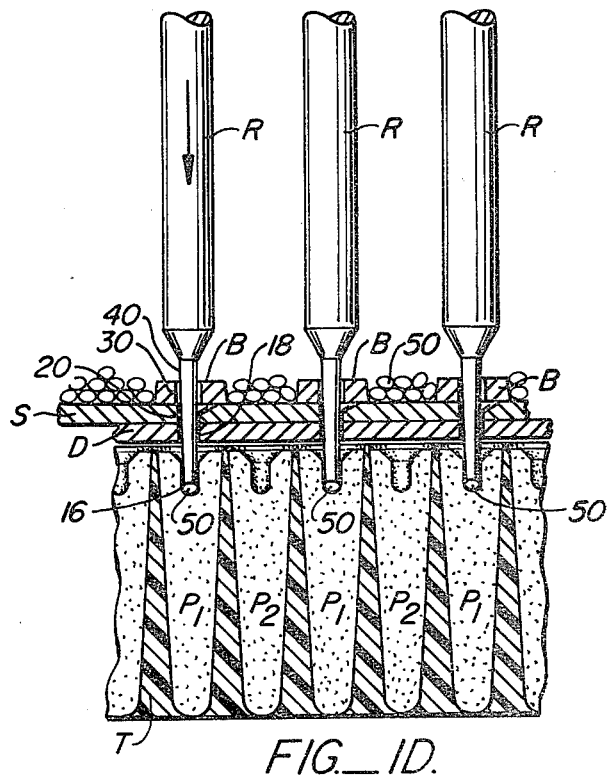
FIG._1D.

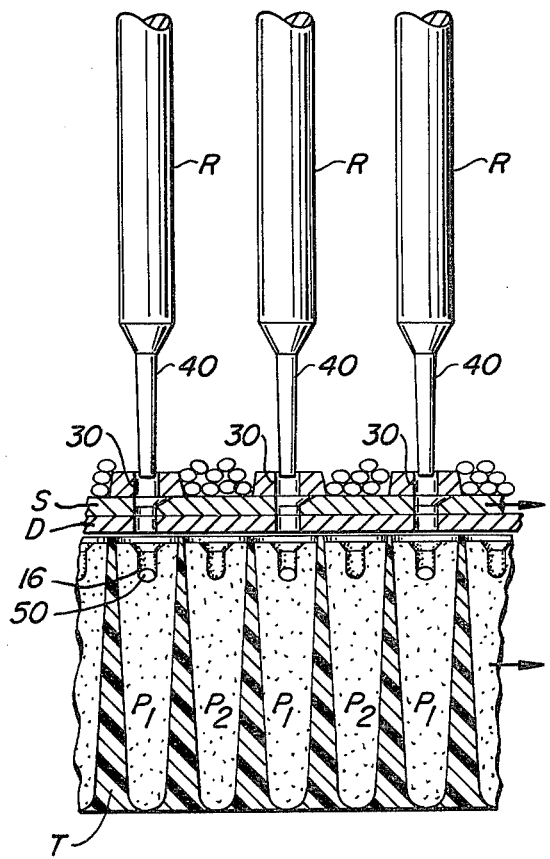
FIG._IE.
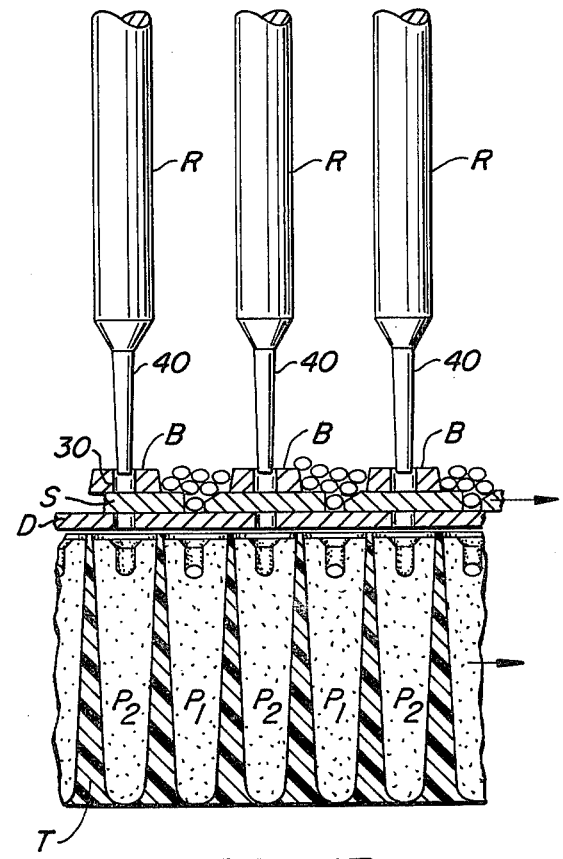
FIG._IF.
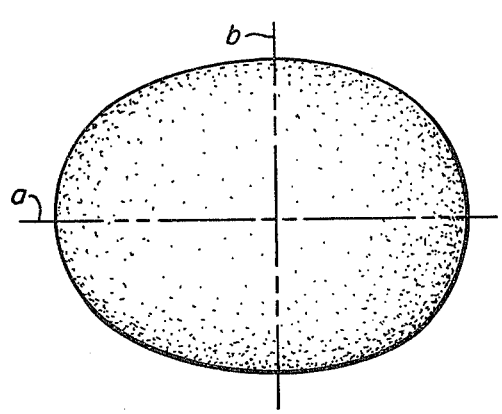
FIG._3.
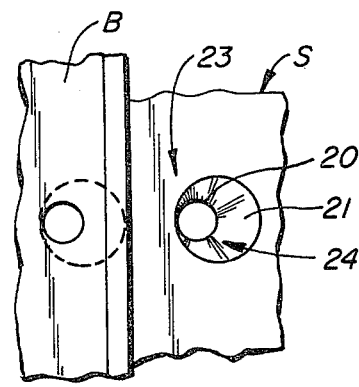
FIG._4.

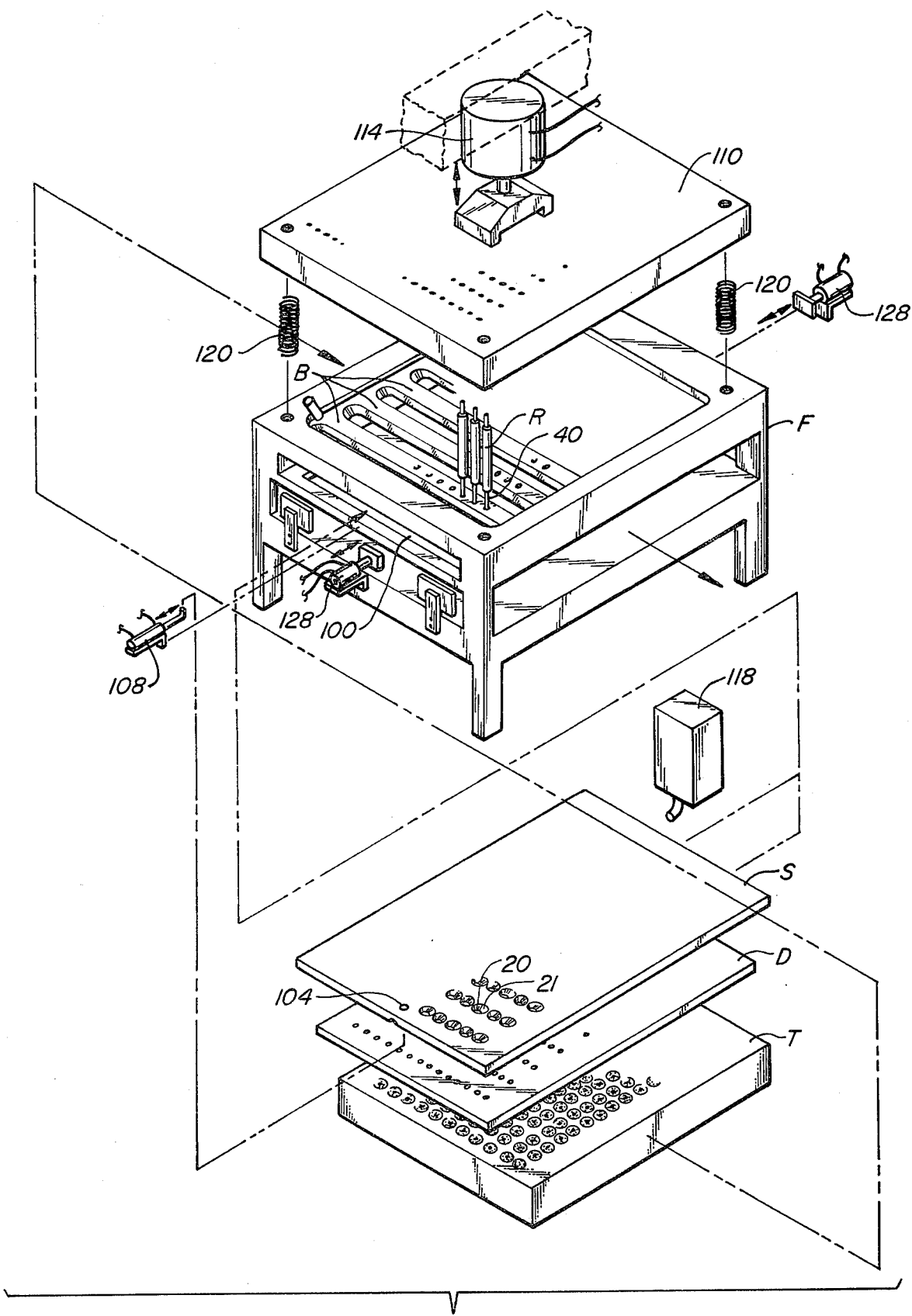
FIG._2.

SINGULATING SEEDER FOR HIGH DENSITY PLUG TRAYS

This invention relates to singulating seeders for use in segregating and delivering individual plant seeds. In particular, it relates to a seeder capable of singulating and seeding a high density array of underlying plugs.

SUMMARY OF THE PRIOR ART

Reciprocating plate matrix singulators are used, for example, in the agriculture industry for singulation of seeds and in the pill industry for singulation of pelletized medicants.

One form of such matrix singulators includes an underlying drop plate with rows of drop holes therein, a reciprocating cell plate with singulating cells therein superposed in sliding contact on the drop plate, and a plurality of bars overlying the cell plate and positioned above the rows of drop holes. The bars typically remain stationary with respect to the drop plate as the singulating cell plate reciprocates. These bars will hereinafter be referred to as "wiper bars" in accordance with the technical terminology developed as a part of this invention.

In operation, seeds for singulation are deposited on the cell plate between the wiper bars, so that individual seeds will find their way into the singulating cells of the cell plate. As the cell plate reciprocates with respect to the stationary drop plate and wiper bars, a seed captured in a singulating cell will be carried to a position over a drop hole in the drop plate. The wiper bar prevents other seed from entering the singulating cells when the cells are in position over the corresponding drop holes.

Typically, the prior art has included an eccentric frustoconical relief over and above the singulating cells of the cell plate. The eccentricity imparted to the frustoconical relief is precipitous to and towards the wiper bar and is gradual away from the wiper bar. When an individual seed is deposited in a singulating cell, excess seed accumulates about the relief. When reciprocation of the cell plate occurs, the wiper bar urges the excess seed up the gradual slope of the extended portion of the eccentric frustoconical relief and clears the seed away without crushing or severing it against the rim of the cell.

Such prior art singulating seeders have severe limitations.

First, the drop plates have been provided with apertures considerably larger than the size of the particles being singulated. This has been desirable in the past because such devices have operated on the free fall of the singulated particles through the drop plate apertures to their targets below. The free-fall principle provides satisfactory seeding when the targets are large, such as greenhouse trays having large soil compartments. When such devices are used to deposit singulated seeds in precision locations, however, the oversized drop holes allow many of the singulated seeds to miss their targets.

Recently, soil plugs for transplantation have been fabricated in a high-density matrix, provided by a square tray roughly thirteen inches on a side and containing an array of small soil plugs positioned on five-eighth inch centers. Each of these plugs is typically provided with a frustoconical aperture at the top leading to a cylindrical cavity at the bottom, which is generally not much larger in diameter than the dimensions of a seed.

It has proved difficult to seed these trays with any degree of precision and thoroughness by means of the prior art devices. Seeders with large drop holes are too inaccurate for use with such closely spaced arrays. Decreasing the size of the drop holes, however, has not improved performance. Apparently, a seed falling through a drop hole is subjected to various irregular and sporadic forces, which deflect the seed from its free-fall path in an unpredictable manner and cause it to miss its mark. For example, irregular and uncontrollable deflections appear to be introduced by static electricity collected on the apparatus or the seed. Other deflections can arise from the surface tension of moisture collected on the drop plate from the generally wet plug trays, or by the flow of air between the drop plate and tray and about the seed as it tumbles. The magnitude of such random deflection forces is generally small and is not of any consequence in prior art applications where the targets are large or the singulated particles are heavy. In precision seeding applications, however, they cause the seed drop to be highly irregular.

Even if a seed should come close to its target and land within the margin of the frustoconical aperture to a soil plug seed cavity, the seed frequently fails to roll into the seed cavity on its own accord because of frictional forces or because of the seed's irregular ellipsoidal shape. A seed failing to find its way into the seed cavity will result in an unsprouted, hence wasted plug.

It also sometimes happens that broken seeds or fragments of coated seeds are admixed in amongst the good seed. Such fragmented portions can become jammed in the singulating cells and prevent any subsequent seed from being deposited into plugs underlying the jammed cells.

The net result of the deficiencies of known seeders in seeding high-density soil plug arrays is that intolerable numbers of plugs fail to spout either due to improper seed placement or no placement at all.

SUMMARY OF THE INVENTION

A seeder is disclosed which includes prior art elements of a bottom stationary drop plate, an intermediate and sliding reciprocating cell plate with individual singulating cells, and wiper bars overlying the cell plate. The improvement herein has the overlying wiper bars apertured in registry to the underlying drop holes. The cell plate at each individual singulating cell reciprocates to and from a position of registry with and to the wiper bar apertures above and drop apertures below. Reciprocation to a position of registry collects a singulated seed in each cell of the cell plate, and thus places the seeder in position for seeding with singulation. A probe, registered to the wiper bar aperture is mounted for reciprocation relative to the wiper bar aperture. The reciprocating motion of the probe is actuated when registration of the singulating cell to the wiper bar aperture and drop hole is effected. Upon occurrence of this registration, the probe passes downwardly, penetrates through and clears both the singulating cell and drop hole. Probe penetration typically continues, passing beyond the bottom of the drop hole to urge seed into the receiving aperture only of the underlying plug.

OTHER OBJECTS, FEATURES AND ADVANTAGES

An object of the invention is to adapt a prior art singulating seeder to the precision placement of seed in cylindrical cavities of underlying transplant plugs arranged in a high density matrix, such as that provided by trays in which such plugs are formed, seeded and sprouted with embryonic plants. According to this aspect of the invention, overlying wiper bars have apertures drilled in registry with underlying drop holes in a drop hole plate. A cell plate which reciprocates sandwiched between the wiper bars on its upper surface and the drop hole plate on its lower surface is used to singulate seed. Upon movement of the cell plate the singulating cells are reciprocated to and from a position of registry between the aligned wiper bar holes and drop holes. In a position away from registry a singulated seed is gathered in each singulating aperture of the cell plate. When the cell plate reciprocates to a position of registration with the aligned wiper bar apertures and drop holes, excess seed is swept from the cell plate about the singulating aperture, typically at an eccentrically disposed frustoconical relief. When registry of the singulating cell occurs between the aligned wiper bar aperture and drop hole, a probe, typically maintained in a position of partial penetration to the wiper bar aperture, penetrates downwardly to and through the registered singulating cell in the cell plate and underlying drop hole in the drop hole plate. Preferably, the probe penetrates to and beyond the bottom of the drop hole plate to forcibly eject any seed from the seeder. The probes accomplish the following each and every time the singulating cells are brought into registry with the drop holes. First, they insure that the sliding cell plate holes will be cleared after each seeding cycle, so that all the cell plate holes will be free to pick up seed, and all the seed picked up will be placed into plugs below. Second, they insure that each seed will be placed at exactly the same depth in the soil plugs every time. In this manner, precision dropping of the singulating seed to underlying cylindrical apertures is achieved.

It should be noted that while the dimension of the drop hole enables accurate placement of the seed, without the disclosed probe the invention is inoperative. Specifically, without the disclosed probe seed will clog and subsequently jam the seeder.

In understanding this aspect of the invention, it should be noted that the shape of most seed can be approximated by an ellipsoid of revolution (a surface formed by rotating an ellipse about one of its axes). The ellipsoid so generated comes close to and approximates the outer skin or shape of seed. Indeed, seed of highly irregular shape is often coated with a clay or vermiculite compound to produce an ellipsoidal shape. Prior art drop holes have typically exceeded by many times the "major axis" of the seed. As a result of this size—coupled with the aforementioned sporadic influence of moisture, electrostatic and fluid forces—drop has been irregular and unpredictable.

A further object of this invention is to provide a seeder which can effect high density seeding according to the process and with the cleaning and probing apparatus of this invention. A seeding mechanism is therefore disclosed which is capable of receiving a high density tray with plugs placed therein. This tray is juxtaposed at its upper surface immediately to the lower surface of the drop plate. The spatial interval between the drop plate and underlying tray is less than the minor axis of the ellipsoid of the seed being seeded. In sequence, the cell plate is reciprocated with singulated seed to a position of aperture registration with the drop hole. Thereafter the probe in the wiper bar aperture penetrates first the singulating cell in the cell plate and thereafter the drop hole. This penetration occurs to effect precision placement of the seed.

It is to be noted that the dimension between the upper surface of the receiving tray and the lower portion of the drop plate has found to be critical. Where this dimension exceeds the minor axis of the ellipsoidal revolution of the seed, misplacement with resultant non-sprouting of seed results.

Other objects, features and advantages of this invention will be more apparent after referring to the following specification and attached drawings in which:

FIGS. 1A-F are a cartoon series of the seed ejection apparatus and process of this invention illustrating respectively in FIG. 1A the position of a cell plate with the singulating cell out of registration between a wiper bar and drop hole for the singulating accumulation of seed; in FIG. 1B, the movement of the cell plate towards a position of registration with the wiper bar and drop hole for clearing all but the singulated seed from the vicinity of the aperture; in FIG. 1C the registration of the singulating cell and drop hole with the overlying wiper bar and seed clearing probe; in FIG. 1D the penetration of the probe from the wiper bar aperture, through the singulating cell, through the drop hole and beyond the drop hole to and towards the receiving aperture in the plug; in FIG. 1E the retraction of the probe after seeding; and in FIG. 1F the movement of the entire plug tray for seeding of alternate rows of plugs;

FIG. 2 is an exploded perspective view of various operative parts of this invention illustrating an underlying tray having plugs with cylindrical apertures therein to be seeded, an overlying drop plate, a cell plate with individual singulating cells in eccentrically placed frustoconical reliefs, overlying wiper bars and wiper bar apertures and a corresponding and overlying matrix of probes for reciprocation into and out of the respective wiper bar apertures, singulating cells, drop holes for the singulation of seed in accordance with this invention;

FIG. 3 is an illustration of a typical ellipsoidal seed; and

FIG. 4 is a top plan view of a frustoconical eccentric relief of the cell plate and portion of a wiper bar.

Referring to FIG. 1A, the operative parts of this invention may be viewed. Specifically, a tray T is shown sectioned along rows of alternating plugs $P_1$, $P_2$. As can be seen, these plugs are generally of overall frustoconical shape and have an indentation in the upper portion thereof for receiving seed. Typically, each of the plugs includes a frustoconical aperture 14 and a cylindrical aperture 16. It is desired to have seed fall to and become within the cylindrical aperture 16. Seed failing to fall completely within cylindrical cavity 16 will mature at a different rate, if at all, and produce nonuniformity of the final crop. Thus it is easily seen that the overall purpose of this invention is to insure precise placement of the seed to the cylindrical aperture 16.

As will become more apparent with respect to FIG. 1F, it is an overall purpose of this invention to first seed the plugs $P_1$. Thereafter, and by movement of the tray T by the dimension of the centerline distance of the plugs, alternating rows of plugs $P_2$ may then be seeded.

Drop hole plate D is the lowermost element of the seeder of this invention. It has configured within it drop holes 18, one such drop hole overlying each plug $P_1$ at its respective cylindrical aperture 16.

In sliding contact with the upper surface of drop hole plate D, there is a singulating plate S. Plate S includes singulating apertures 20, which apertures are dimensioned to capture the seed.

Overlying each singulating aperture 20, there is a frustoconical aperture 21. Aperture 21 may best be seen in the view of FIG. 4.

Referring to FIG. 4, it will be seen that aperture 20 is surrounded by a frustoconical relief 21. Relief 21 is not concentrically fashioned about the singulating aperture 20. Instead, it is precipitous towards bar B at portion 23 and gradual away from bar B on the opposite side of singulating aperture 20 at 24. This eccentric aperture, known in the prior art, enables the sweeping away of seed without crushing, as will become more apparent referring to FIG. 1B.

Returning to FIG. 1A, it will be seen that a wiper bar B overlies each of the drop holes 18. Wiper bar B is placed so that it captures signulating cell plate S with a clearance of about one ten-thousandth of an inch. The cell plate slides on the upper surface of the drop hole plate D and beneath the lower surface of the wiper bar B.

Each of the wiper bars B is provided with apertures 30. These apertures 30 are in registry to the underlying drop holes 18. They are in effect aligned with the drop holes 18 so that the respective probes 40 attached to the rods R may forcibly eject seed from the seeding mechanism of this invention.

It will be noticed that rods R at their seed ejecting probes 40 are maintained in a position of partial but not full penetration of the apertures 30 in the wiper bars B. This position of partial penetration prevents accumulated seed from entering into the wiper bar apertures 30 and maintains the probes 40 depending from their rods R in a position for actuating penetration as is more particularly illustrated with respect to FIG. 1D.

Having discussed the elements of this invention in detail with respect to FIG. 1A, attention will now be devoted to the cartoon series of FIGS. 1B-1F to illustrate the operative mechanical pattern of this invention.

Referring to FIG. 1B, it will be seen that cell plate S has begun its reciprocation between drop hole plate D on the bottom and wiper bars B on the top. The frustoconical aperture 21 and singulating aperture 20 are proportioned to receive only a single seed. The frustoconical aperture 21 at portion 24 has caused seed 50 accumulated between the wiper bars B to singulate at the singulating apertures 20 and thereafter to be swept from the frustoconical aperture 21, all without crushing of the seed that would otherwise clog its operation. It is emphasized that the frustoconical aperture and its function are known in the prior art.

Referring to FIG. 1C, it will be seen that singulating cell S has been reciprocated into position of registry between the drop hole apertures 18 and the wiper bar apertures 30. It is noted that the singulated seed in each case is now aligned so that even if a broken seed or seeds should be caught in the holes 20, downward passage of the probes 40 causes ejection of the singulated seed or jammed seed fragment.

Referring to FIG. 1D, penetration of the rods R through the wiper bar aperture 30, the singulating cell aperture 20 and the drop hole 18 has occurred. Singulated seed 50 has been expelled from the singulating cell 20 down through the drop hole aperture 18 and into the cylindrical aperture 16 of each plug. It is thus seen with the downward movement of the rods R and their respective probe portions 40 that each of the plugs $P_1$ is in effect seeded.

Referring to FIG. 1E, rods R in their respective probes 40 are shown in the retracted position. In this disposition, seed 50 has been left deposited behind in each of the apertures 16 within the frustoconical upper opening 14 of the plugs $P_1$.

Once rods R are returned to their retracted position, cell plate S returns to a position wherein each of its singulating apertures 20 is disposed between the wiper bars B. In this disposition, seed can again accumulate within the cell plate S at the singulating apertures 20.

It was noted in the earlier discussion relating to FIG. 1A that only alternate rows of plugs $P_1$ were seeded. Intervening rows of plugs $P_2$ were not seeded. Seeding of the intervening rows is not attempted because interstitial spacing between the wiper bars B is required for the singulation of seed. By the expedient of providing for the reciprocation of the tray T to respective edges, first on one side of the tray and then on the opposite side of the tray, alternate groups of holes $T_1$ and $T_2$ can be aligned for seeding. In this manner of alignment an entire tray can be seeded with two reciprocations of the cell plate S. By way of example, a tray approximating a dimension of 13 inches by 13 inches has 200 cells $P_1$ seeded with a first reciprocation of the plate S and the remaining 200 cells seeded with a second reciprocation of the plate S.

Having set forth in side elevation section the cycle of this invention, some attention can be given to the seed, a detail of which is shown in FIG. 3.

Such seed is typically coated with mud or the like by techniques well known in the art. The coatings leave the outer periphery of the seed with an overall ellipsoidal like configuration.

Three-dimensional ellipsoids or two-dimensional ellipses can be described by a formulation which includes a major axis a and a minor axis b. For the purposes of this invention, by generating an ellipse utilizing the major axis a and the minor axis b, and thereafter rotating the ellipse about one of its axes, preferably the major axes a, one obtains an accurate approximation of the configuration of the seed. The distance between the upper portion of the tray T and the bottom of the drop hole plate D should not exceed the dimension of the minor axis of the ellipsoid b. This tight tolerance assures relatively precise placement of the seed to the underlying plug matrix. Having set forth the overall operation and construction of this device, FIG. 2 illustrates an exploded view.

Referring to FIG. 2 and shown in exploded relation are a tray T, a drop hole plate D and a singulating cell plate S. Overlying cell plate S is a frame F, which frame accommodates both the drop hole plate D and the cell plate S in the interior of a rectangular channel 100. Typically, cell plate S is grasped at an aperture 104 by a lug protruding upwardly from an air cylinder 108 so that reciprocation of the cell plate to and from positions of alignment of the singulating cells 20 between the drop holes 18 and wiper bar apertures 30 may occur. Wiper bars B are fastened across the top of frame element F. These bars in turn are penetrated by a matrix of rods R at lower portions 40. The rods are in turn fastened at their upper end to a rod plate 110. Rod plate 110 is reciprocated by a cylinder 114 when registry of cell plate S is sensed by a limit switch 118. Springs 120 at the corners of plate 110 conventionally damp and return the plate 110 to the withdrawn position once reciprocation of the cell plate has occurred.

Movement of the tray T to one side and/or the other side of the frame F for seeding alternate rows of plugs P₁, P₂ is effected by a cylinder 128.

It is be emphasized that the probes and mechanics of this invention are the result of extensive experimentation. It was found in actual practice that the accurate high-speed seeding of high density plugs with the individual seeds being deposited in and to the cylindrical apertures 16 was accomplished only with great difficulty. While the explanations of this seeding device appear relatively simple, their explanation is vastly easier than was their conception.

What is claimed is:

1. In a singulator for singulating small particles from a mass thereof of the type wherein an underlying drop plate with at least one drop hole has an overlying and reciprocating singulating plate with at least one singulating cell therein, and said singulating plate includes an overlying wiper bar overlying said drop hole, and said wiper bar, singulating plate and drop plate are juxtaposed for sliding reciprocation of said singulating plate with respect to said drop plate and wiper bar, the improvement comprising: an aperture in said wiper bar registered to and overlying said drop hole; a probe for reciprocating through said aperture in said wiper bar beyond said drop hole to eject seed from said singulating cell, and means for reciprocating said probe when said singulating cell and drop hole are in registry.

2. A process for singulating seeds including the steps of providing a drop plate with at least one drop hole therein; providing an overlying and reciprocating singulating plate with at least one singulating cell therein; providing a wiper bar overlying said drop hole in said drop plate and confining for reciprocation therebetween said singulating plate, said confinement permitting reciprocation of said singulating cell to and from a position of registration with said drop hole; placing seeds adjacent said wiper bar on the upper surface of said singulating plate to accumulate in said singulating cell a singulated seed; reciprocating said seed to a position of registration to said drop hole with said wiper bar thereover; providing a probe and probe aperture in said wiper bar; reciprocating said probe downwardly to and beyond said drop hole a sufficient distance to dislodge singulated seed from said singulating cell.

3. A process for singulating seeds including the steps of providing a drop plate with at least one drop hole therein; providing an overlying and reciprocating singulating plate with at least one singulating cell therein; providing a wiper bar overlying said drop hole in said drop plate and confining for reciprocation therebetween said singulating plate, said confinement permitting reciprocation of said singulating cell to and from a position of registration with said drop hole; placing seeds adjacent said wiper bar on the upper surface of said singulating plate to accumulate in said singulating cell a singulated seed; reciprocating said seed to a position of registration to said drop hole with said wiper bar thereover; providing a probe and probe aperture in said wiper bar; providing a soil plug beneath said drop hole; reciprocating said probe downwardly to and beyond said drop hole a sufficient distance to dislodge singulated seed from said singulating cell and place it into said soil plug.

4. In a seed singulator for singulating seed from an unsingulated quantity thereof wherein said seeds include an ellipsoid of revolution generated about a major axis and having a minor axis, an improved singulator comprising: an underlying drop plate with at least one drop hole, said drop hole having a diameter in the range on one-quarter larger than the major axis of the ellipsoid of revolution of said seed; an overlying and reciprocating singulating plate with at least one singulating cell therein, said singulating cell movable to and from a position of registration with said drop hole, a wiper bar overlying said drop hole and capturing said singulating plate therebetween for permitting reciprocating movement of said singulating plate to and from a position of registration of said singulating cell and said drop hole, said wiper bar having an aperture overlying said drop hole; a probe partially penetrating said wiper bar aperture; means for moving said singulating cell into registry between said wiper bar aperture and drop hole; and means for reciprocating said probe downwardly and beyond said drop hole to expel singulated seed.

5. The invention of claim 4 and wherein said drop hole is registered to an underlying tray by a dimension less than the minor axis of the ellipsoid of revolution.

* * * * *